(12) United States Patent
Rozenbaoum

(10) Patent No.: US 8,784,093 B2
(45) Date of Patent: Jul. 22, 2014

(54) COOLING APPARATUS FOR MICROREPLICATION

(75) Inventor: Eugene Rozenbaoum, Pasadena, CA (US)

(73) Assignee: Avery Dennison Corporation, Glendale, CA (US)

(*) Notice: Subject to any disclaimer, the term of this patent is extended or adjusted under 35 U.S.C. 154(b) by 0 days.

(21) Appl. No.: 13/304,998

(22) Filed: Nov. 28, 2011

(65) Prior Publication Data
US 2012/0298336 A1 Nov. 29, 2012

Related U.S. Application Data

(60) Provisional application No. 61/418,153, filed on Nov. 30, 2010.

(51) Int. Cl.
*B29C 35/16* (2006.01)

(52) U.S. Cl.
USPC .................. 425/446; 264/348; 425/373

(58) Field of Classification Search
USPC .......... 425/363, 371, 373, 445, 446; 264/237, 264/348
See application file for complete search history.

(56) References Cited

U.S. PATENT DOCUMENTS

| | | | |
|---|---|---|---|
| 4,601,861 A * | 7/1986 | Pricone et al. ................. | 425/373 |
| 5,945,042 A * | 8/1999 | Mimura et al. ................ | 425/373 |
| 6,024,907 A * | 2/2000 | Jagunich ........................ | 425/373 |
| 6,972,103 B1 | 12/2005 | Nawrath | |
| 8,147,234 B2 * | 4/2012 | Ogino et al. ................... | 425/373 |
| 2005/0244614 A1* | 11/2005 | Bharadwaj et al. ........... | 428/167 |
| 2008/0001316 A1* | 1/2008 | Jain et al. ...................... | 425/363 |

FOREIGN PATENT DOCUMENTS

| | | |
|---|---|---|
| DE | 10323941 | 12/2004 |
| WO | 01/98066 | 12/2001 |
| WO | 2008/002789 | 1/2008 |

OTHER PUBLICATIONS

International Search Report dated Mar. 7, 2012 from International Application No. PCT/US11/062199 filed Nov. 28, 2011.
Written Opinion dated Mar. 7, 2012 from International Application No. PCT/US11/062199 filed Nov. 28, 2011.

* cited by examiner

*Primary Examiner* — James Mackey
(74) *Attorney, Agent, or Firm* — Avery Dennison Corporation

(57) ABSTRACT

According to one exemplary embodiment, an apparatus for microreplication is disclosed. The apparatus includes a cooling unit that contains a bottom layer, a plurality of side walls, and an intermediate layer. The bottom layer has an outer perimeter, and the plurality of side walls surround the outer perimeter of the bottom layer. The intermediate layer is positioned between the bottom layer and an upper portion of the side walls. The intermediate layer may include a plurality of openings, which may either hold a device that dispenses cooling agents or be used for drainage of cooling agents. The method utilizes the apparatus after heating and pressing of a polymer film during microreplication.

11 Claims, 4 Drawing Sheets

COOLING APPARATUS FOR MICROREPLICATION

CROSS-REFERENCE TO RELATED APPLICATION

The present application claims priority from U.S. Provisional Application No. 61/418,153 filed Nov. 30, 2010, which is incorporated by herein by reference in its entirety.

SUMMARY OF THE INVENTION

The present invention is in the field of manufacturing films containing microreplicated patterns in order to create a surface topography having a particular optical property. More particularly, the present invention is directed toward improving manufacturing efficiencies of certain microreplication processes.

BACKGROUND OF THE INVENTION

Microreplication is a process where softened polymer film or an extruded material is brought into contact with a pressure nip such that an extrudate or softened film is pressed against a tool with fine patterning or a particular surface topography on it. The pattern or topography is reversely transferred onto the side of the material in contact with the tool. The foregoing process is widely used in roll to roll manufacturing methods to produce patterned or replicated products such as reflective materials, and other optical films.

A typical microreplication process includes a heating means to soften the polymer material which may be provided as a film or extrudate, and then using heat and pressure to impress the pattern onto the polymer material, and then cooling the material to cool the patterned polymer before being rolled up, sheeted or otherwise collected.

The manufacturing speed can be limited by the slowest process, which can be determined by any one of the steps (heating, pressing, cooling) mentioned above. With advancement in heating, such as through NIR, the cooling step then may become the bottle neck, i.e. the film does not get cooled fast enough so the production speed has to be lowered to provide sufficient time for the film to cool further. Currently, the cooling is conducted through the employment of cooling air, such as recirculating fans, blowers, chilled rollers, and the like.

There are a number of prior methods to improve cooling of films or webs. One such example is to use heat conduction to remove heat from the film. It is well known that heat transfer coefficient of heat conduction is the order of magnitude higher than that of heat convection (by air). Cooling by conduction is commonly achieved by means of a continuous cooling belt, single or double. This type of equipment found broad implementation in pharmaceutical and food industries. Typically, such a thin metal belt (stainless steel or brass) is connected at its ends to form a closed loop. The belt is kept cooled by spraying chilled water or other cooling agent on the side of the belt opposite to the surface that requires cooling. Due to high heat transfer through the metal, heat is efficiently removed from the hot surface. In this process, it is critical to ensure a good contact between the hot and cold surfaces. In the event that there is an air gap between the surfaces of the cooling belt and the film being cooled, the heat transfer coefficient drops dramatically and cooling becomes inefficient. Exemplary manufacturers of such cooling equipment include Sandvik and BBA.

Therefore, there is a need for an improvement for the cooling step in order to facilitate the production of the patterned product having a particular surface topography.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention. According to one exemplary embodiment, an apparatus for microreplication is are disclosed. The apparatus includes a cooling unit that contains a bottom layer, a plurality of side walls, and an intermediate layer. The bottom layer has an outer perimeter, and the plurality of side walls surround the outer perimeter of the bottom layer. The intermediate layer is positioned between the bottom layer and an upper portion of the side walls. The intermediate layer may include a plurality of openings, which may either hold a device that dispenses cooling agents or be used for drainage of cooling agents. The method utilizes the apparatus after heating and pressing of a polymer film during microreplication.

It is an object of the present invention to provide for a system with a cooling belt for microreplication including a belt forming a loop around a first set of rollers, a second set of rollers that support the belt and a film and at least one nozzle for delivering at least one cooling agent wherein at least one nozzle is located underneath the belt and the film.

It is yet another object of the present invention to provide for a system with a cooling belt for microreplication including a belt forming a loop around a first set of rollers that support the belt and a film and at least one nozzle for delivering at least one cooling agent wherein at least one nozzle is located underneath the belt and the film.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

Unless otherwise indicated, the illustrations in the above figures are not necessarily drawn to scale.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to figures.

A cooling method of microreplication is disclosed. The cooling method employs heat conduction in cooling embossed polymer film.

Figure 1:
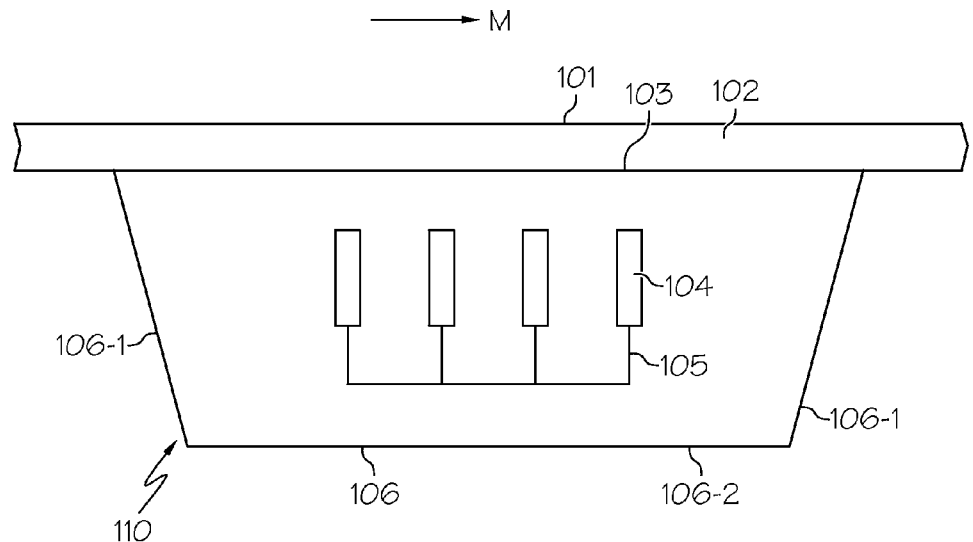
FIG. 1 is a schematic illustration of a cooling unit.

FIG. 1 provides an illustration of a cooling unit 110. The cooling unit 110 includes a tank 106 and a set of nozzles 104. The tank 106 has two side portions 106-1 and a bottom portion 106-2. The set of nozzles 104 are connected by a feeding tube 105 that may either feed the set of nozzles 104 from a common source or individually.

After heating, an embossed polymer film, or web, 102 is incrementally indexed forward, indicated by arrow M, over the cooling unit 110. The embossed polymer film 102 has a backside 103 and a front side 101. The front side 101 includes an embossed pattern from heating and pressing the embossed polymer film 102 and is not in contact with the cooling unit 110, while the backside 103 of the embossed polymer film 102 is in contact with the cooling unit 110.

In cooling the embossed polymer film 102, the set of nozzles 104 spray a cooling agent directly onto the backside 103 of the embossed polymer film 102, and the tank 106 is used to collect the cooling agents once expelled from the nozzles 104 to either be recycled or disposed. A pumping and chilling system may also be used for delivery of the cooling agents.

The cooling agent may include but is not limited to water, chilled water, water mixed with glycol, glycol, or water mixed with air.

Each nozzle 104 is connected by the feeding tube 105 to a supply of cooling agents. The feeding tube 105 may either provide the cooling agents from one supply or from several independent supplies. When the feeding tube 105 feeds the nozzles 104 from independent supplies of cooling agents, different types of cooling agents may be provided at once. In addition, the nozzles 104 may be equipped with control valves that allow one type of agent to be utilized while other cooling agents are not in use. The control valves can be added to each nozzle 104, or each roll of nozzles, or nozzles for a specific area.

In addition, a flow rate at which the cooling agent is supplied may be varied. That is, two or more types of cooling agents may be supplied from the set of nozzles 104 to the backside 103 of the embossed polymer film 102, either at the same flow rate or different flow rates so that temperature can be modified as is necessary to increase or decrease cooling rates in the cooling unit 110. By individually feeding the cooling agents, different cooling agents may be used with one manufacturing process or with different manufacturing processes or materials. By allowing additional cooling agents to be used in different manufacturing processes, an entire system does not need to be purged when there is a changeover of materials or requirements for different processing applications.

Another advantage of individually feeding the cooling agents, the temperature of the cooling agents can vary depending on the type of material that is used for cooling. For example, water used as the cooling agent can range from about 45° F. to about 55° F., while glycol when used as the cooling agent may have a temperature range of about 45° F. The feeding tube 105 can draw the cooling agent from one or more tanks depending on requirements, size and speed of the manufacturing operation.

The cooling efficiency for a given set of nozzles 104 can be further improved by adjusting the distance between the nozzles 104 and the embossed polymer film 102, or an angle at which the nozzles 104 are pointed towards the embossed polymer film 102.

The cooling unit 110 will be attached to the microreplication apparatus with water proof sealing. In addition, an air drying unit or air knife may be arranged downstream of the cooling unit to dry off and remove any residual cooling agent that remains on the embossed polymer film 102.

Figure 2A:
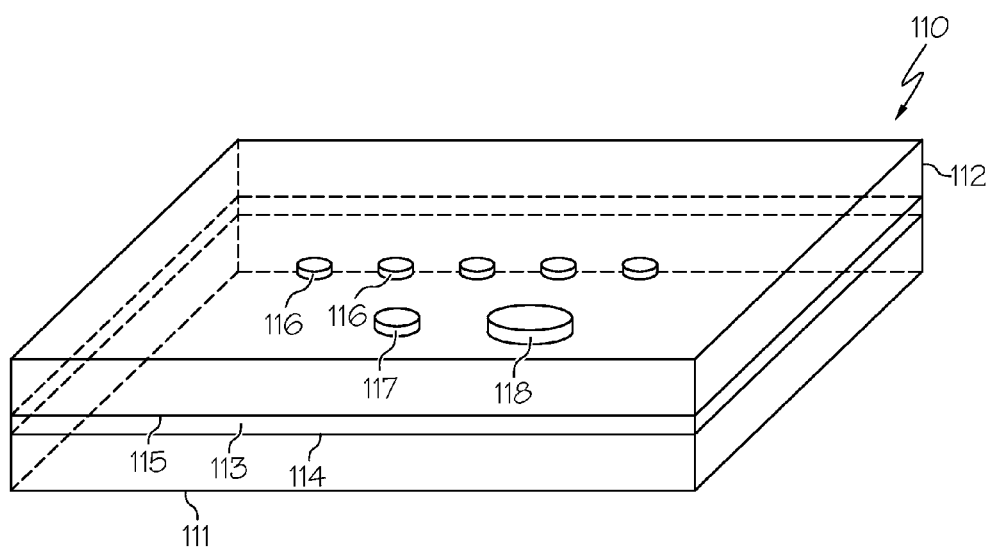
FIG. 2a-2b are schematic illustrations of a design of a cooling unit.
Figure 2B:
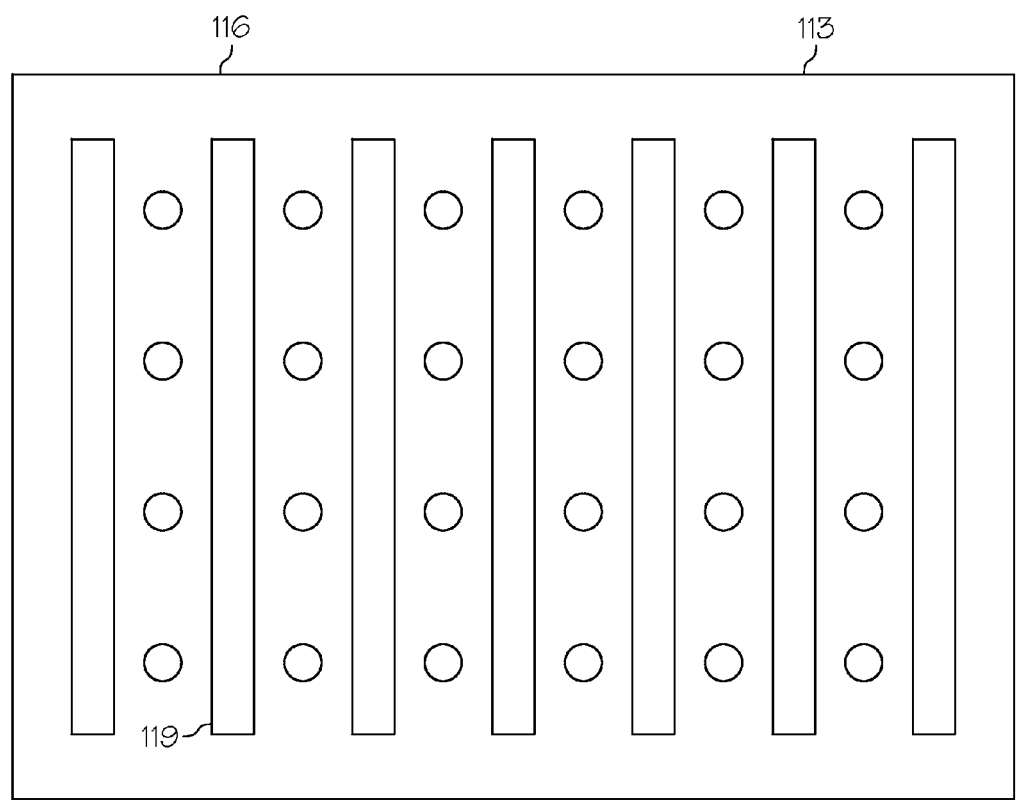

FIGS. 2a and 2b provides illustrations of the cooling unit's design. FIG. 2a depicts a perspective view of a cooling unit 110. The cooling unit 110 has a bottom layer 111, a plurality of side walls 112 having both an upper portion and a lower portion. The bottom layer 111 has a specified area surrounded by an outer perimeter wherein the bottom layer 111 has both a top face and a bottom face. As shown in FIG. 2a, the outer perimeter of the bottom layer 111 is in a shape of a rectangle. If the bottom layer 112 is rectangular, then there are four side walls surrounding the outer perimeter of the bottom layer 112. In addition to the rectangular shape of the bottom layer 111, other geometric shapes may be utilized for the cooling unit 110 such as a square or hexagon.

The cooling unit also includes an intermediate layer, or carrier tray, 113. The intermediate layer 113 has a top side 115, a bottom side 114 and an outer intermediate layer perimeter. Several holes 116, 117 and 118 are located on the intermediate layer 113. The holes 116, 117 and 118 are of varying sizes to allow for a variety of sized nozzles 104 (FIG. 1) to deliver cooling agents. The intermediate layer 113 is located in the space between the bottom layer 111 and below the top portion of the side walls 112 of the cooling unit 110. The intermediate layer 113 is not in contact with the embossed polymer film 102. The intermediate layer 113 is not in contact with the bottom layer 111 to allow for tubing or conduits to be arranged within the space defined by the intermediate layer 113 and the bottom layer 111.

To collect the cooling agent, the bottom layer 111 may have a drainage hole connected to a central drainage tubing. The central drainage tubing may also collect the spent cooling agent in a central reservoir.

FIG. 2b provides a configuration of holes 116 and spacing of the intermediate layer 113. As indicated, the holes 116 are evenly spaced and aligned. In addition to the holes 116, the cooling unit 110 (FIG. 2a) may contain collecting channels, or collecting grooves or collecting rows, 119 for collecting the cooling agents after the cooling agent have been expelled through the nozzles 104 (FIG. 1), which are located in the holes 116. In addition to the embodiment suggested by FIG. 2b, many configurations for the holes 116 and the collecting channels 119 may be arranged on the intermediate layer 113 to provide a uniform pattern of cooling.

Figure 3:
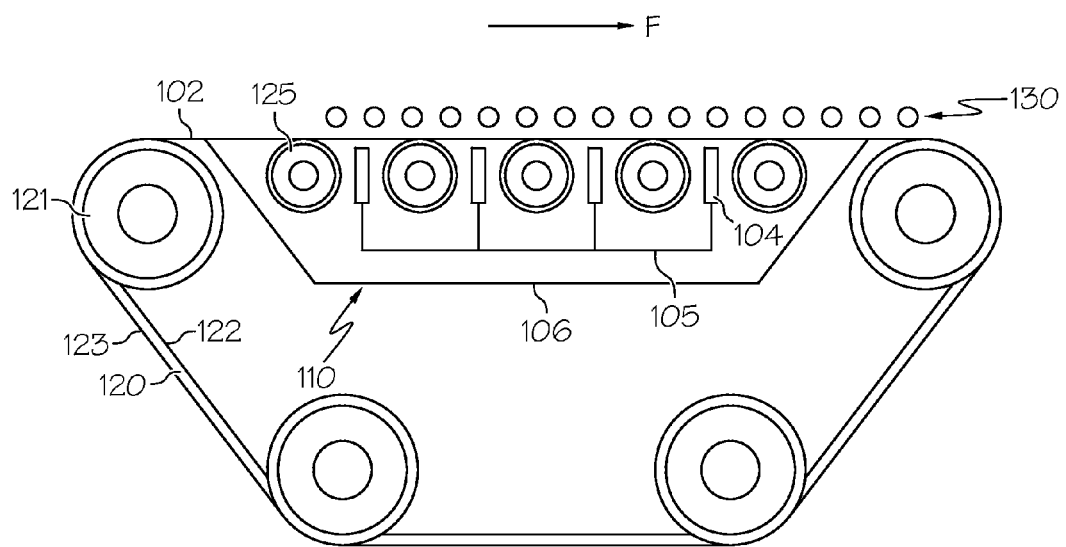
FIG. 3 is a schematic view of a cooling set up.

FIG. 3 depicts an exemplary cooling belt system 130. The cooling belt system 130 includes the cooling unit 110, a thin metal belt 120, a first set of rollers 121 and a second set of rollers 125. The thin metal belt 120 forms a continuous loop around the first set of rollers 121 and a second set of rollers 125. The first set of roller 121 support the thin metal belt 120 as the thin metal belt 120 travels in the continuous loop. The second set of rollers 125 are contained within the cooling unit 110 and support the thin metal belt 120, the embossed polymer film 102 and a set of nozzles 104 for delivering cooling agent.

The thin metal belt 120 has a top side 123 and a bottom side 122. The bottom side 122 of the thin metal belt 120 is in contact with the cooling belt system 130, and the top side 123 of the thin metal belt 120 is in contact with the embossed polymer film 102.

The thin metal belt 120 initially makes contact with the embossed polymer film 102 after heating and pressing the embossed polymer film 102. After initial contact, the thin metal belt 120 moves the embossed polymer film 102 forward, as indicated by arrow F, with the assistance of the first set of rollers 121 and the second set of rollers 125.

As a portion of the embossed polymer film 102 is on top of the thin metal belt 120 and moves forward in the F direction, the set of nozzles 104, which are fed by the feeding tube 105, spray cooling agents on the bottom side 122 of the thin metal belt 120.

The embossed polymer film 102 is preferably in contact or in close approximate contact with the thin metal belt 120 so as to not inhibit movement of the embossed polymer film 102 or otherwise deform an embossed pattern, or topography, which is located on the front side 101 (FIG. 1) on the embossed polymer film 102. Through conduction from the thin metal belt 120 to the embossed polymer film 102, the embossed polymer film 102 will undergo a reduction in temperature, cooling from a molten state in which the embossed pattern is reduced to a lower temperature without destroying the embossed pattern. It is critical to ensure a good thermal contact between the embossed polymer film 102 and the thin metal belt 120 to provide for adequate cooling of the embossed polymer film 102.

In case there is an air gap between the thin metal belt 120 and the embossed polymer film 102, the heat transfer coefficient drops dramatically and cooling becomes inefficient.

Incrementally, the portion of the embossed polymer film 102 will be pulled over the cooling unit 110 in the F direction by the thin metal belt 120, first set of rollers 121, and the second set of rollers 125. As the nozzles 104 continue to spray the thin metal belt 120, the spent cooling agents are collected by the tank 106. Once the portion of the embossed polymer film 102 reaches near an end of the cooling unit 110, the embossed polymer film 102 continues forward and no longer is in contact with the thin metal belt 120, which remains in its continuous loop.

While a thin metal belt 120 has been described, it should be understood that other materials may be used in place of metal, such as a thermal blanket, polymeric or other material that have the ability to remove or wick away heat from a material.

In addition, this embodiment displays four nozzles 104 in the cooling belt system 130; however, any number of nozzles 104 may be configured to the cooling belt system 130. Also, the number of rollers or sets of rollers may be provided in any configuration without departing from the embodiment.

Optionally, the cooling belt system 130 may be used on an opposite side of a microreplication tool or belt to ensure the close thermal contact between the embossed polymer film 102 and the metal belt 120.

In addition, the cooling belt system 130 may include a third set of rollers located above the cooling unit 110 that interfaces with the embossed polymer film 102. The third set of rollers move at the same speed as the embossed polymer film 102 and exerts pressure on the embossed polymer film 102.

Figure 4:
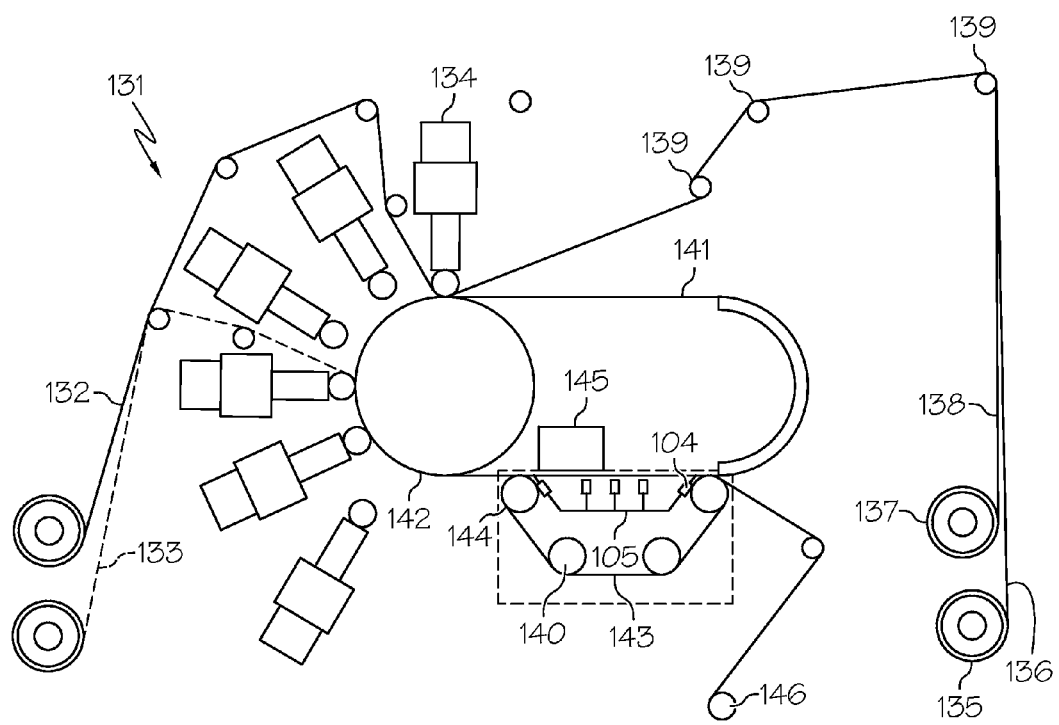
FIG. 4 shows an exemplary view of a microreplication set up.

FIG. 4 is a schematic of a microreplication apparatus 131 with a microreplication cooling belt 140 and a microreplication belt 141 that includes patterns on a surface of the microreplication belt 141.

A first polymer film 136 is wound on a first roll of polymer film 135. A second polymer film 138 may also be provided and wound on a second roll of polymer film 137. The first polymer film 136 and the second polymer film 138 are pulled forward by a set of rollers 139 toward a heated roll 142 to start a microreplication process.

The heated roll 142 is provided for heating up one or more of nip rolls 134, the first polymer film 136 and the second polymer film 138. The first polymer film 136 and the second polymer film 138 travel along the microreplication belt 141 as the nip rolls 134 interact with the first polymer film 136 and the second polymer film 138. The nip rolls 134 provide pressure, which then provides a particular surface topography. The set of rollers 139 keep the first polymer film 136 and the second polymer film 138 moving and to maintain a sufficient tension.

Once the first polymer film 136 and the second polymer film 138 travel along the hot roll 142 and the nip rolls 134, the first polymer film 136 and the second polymer film 138 travel along the microreplication cooling belt 140. The microreplication cooling belt 140 is provided for cooling the first polymer film 136 and the second polymer film 138.

The microreplication cooling belt 140 can be made of metal such as copper, nickel, aluminum or stainless steel and includes a set of rollers 144 that form a closed loop 143 to keep a consistent speed on the microreplication cooling belt 140. The thickness of the microreplication cooling belt 140 can be from about 5 mils to about 25 mils with about 8 mils to about 10 mils being preferred. Multiple spray nozzles 104 may be arranged in an array under a bottom side of the microreplication cooling belt 140 and are fed by the feeding tube 105.

Once the first polymer film 136 and the second polymer film 138 travel along the microreplication cooling belt 140, the first polymer film 136 and the second polymer film 138 is wound up at wind up roller 146.

To ensure good thermal contact between the first polymer film 136 and the second polymer film 138 and the microreplication cooling belt 140, a plenum 145 can be used on a top side of the microreplication cooling belt 140. Additional rolls such as 132 and 133 can be added to the set up to add a protective carrier film or a release liner to enable multilayer lamination on the production line.

Through use of the microreplication cooling belt 140, a peel temperature of the first polymer film 136 and the second polymer film 138, when removed from the microreplication apparatus 131, can be decreased when compared to a conventional microreplication manufacturing process enabling greater stability in collecting polymer film.

The use of cooling agents can also be combined with the air cooling the microreplication apparatus 131 from a same side as the cooling agents, or from an opposite side as the cooling agents. The application of the air cooling and use of the cooling agents can occur simultaneously, substantially simultaneously or at different operational times of the microreplication process. For example, air cooling can occur before and after applying of the cooling agents or vice versa. Air cooling may also be applied to aid in the collection of the cooling agent in the channels as described above.

In addition to the embodiments described, single polymer films or multiple polymer films may be utilized.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims. It will thus be seen according to the present invention a highly advantageous process for producing microreplicated films has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

It will thus be seen according to the present invention a highly advantageous method and apparatus for cooling embossed polymer film has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A cooling unit for microreplication comprising:
   a bottom layer having an area surrounded by an outer perimeter wherein the bottom layer has a top face and a bottom face;
   a plurality of side walls surrounding the outer perimeter of the bottom layer wherein each of the side walls has an upper portion and a lower portion wherein the lower portion of the side wall is attached to the outer perimeter of the bottom layer;
   an intermediate layer having an area surrounded by an outer intermediate layer perimeter and having a top side and a bottom side wherein the intermediate layer is located between the bottom layer and the upper portion of each of the side walls;
   a plurality of openings formed in the intermediate layer; and
   configured to dispense a cooling agent located within one of the plurality of openings.

2. The cooling unit of claim 1, wherein the device is a nozzle.

3. The cooling unit of claim 1, wherein a portion of the plurality of openings are at least one of coolant collecting channels, coolant collecting grooves, and coolant collecting rows.

4. The cooling unit of claim 1, further comprising a cooling agent.

5. The cooling unit of claim 4, wherein the cooling agent is selected from the group consisting of water, glycol, water mixed with glycol, and water mixed with air.

6. The cooling unit of claim 1, wherein a portion of the plurality of openings are equally spaced apart holes.

7. The coolant unit of claim 1, wherein the device is a plurality of nozzles.

8. The coolant unit of claim 7, wherein a first portion of the plurality of nozzles dispense a first cooling agent and a second portion of the plurality of nozzles dispense a second cooling agent.

9. The cooling unit of claim 5 wherein the temperature of the cooling agent ranges from about 45° F. to about 55° F. when the cooling agent is water.

10. The cooling unit of claim 1, wherein the flow rate of the cooling agent through the dispensing device is variable.

11. The cooling unit of claim 8, wherein the flow rate of the first cooling agent through the first portion of the plurality of nozzles is different from the flow rate of the second cooling agent through the second portion of the plurality of nozzles.

* * * * *